United States Patent
Rocker et al.

(10) Patent No.: US 8,709,188 B2
(45) Date of Patent: Apr. 29, 2014

(54) LAY-UP ARRANGEMENT AND STRUCTURAL ARRANGEMENT AND METHOD FOR PRODUCING A COMPONENT FOR AEROSPACE

(75) Inventors: Olaf Rocker, Stade (DE); Manuel Jung, Stade (DE); Thorsten Bleck, Holm (DE)

(73) Assignee: Airbus Operations GmbH, Hamburg (DE)

( * ) Notice: Subject to any disclaimer, the term of this patent is extended or adjusted under 35 U.S.C. 154(b) by 594 days.

(21) Appl. No.: 12/309,896

(22) PCT Filed: Jul. 10, 2007

(86) PCT No.: PCT/EP2007/057032
§ 371 (c)(1),
(2), (4) Date: Jun. 18, 2009

(87) PCT Pub. No.: WO2008/015082
PCT Pub. Date: Feb. 7, 2008

(65) Prior Publication Data
US 2009/0269596 A1 Oct. 29, 2009

Related U.S. Application Data

(60) Provisional application No. 60/834,650, filed on Aug. 1, 2006.

(30) Foreign Application Priority Data

Aug. 1, 2006 (DE) .......................... 10 2006 035 847

(51) Int. Cl.
*B65H 81/00* (2006.01)
*B32B 38/18* (2006.01)

(52) U.S. Cl.
USPC ............ 156/189; 156/523; 156/574; 156/577

(58) Field of Classification Search
USPC .......... 156/166, 523, 574, 577, 184, 189, 191
See application file for complete search history.

(56) References Cited

U.S. PATENT DOCUMENTS 3,577,297 A 5/1971 Howard
4,556,592 A 12/1985 Bannink, Jr.
(Continued)

FOREIGN PATENT DOCUMENTS

DE 19539682 6/1998
DE 19649617 6/1998
(Continued)

OTHER PUBLICATIONS

German Office Action for DE 10 2006 035 847.3 dated Mar. 12, 2007.

(Continued)

*Primary Examiner* — Scott W Dodds
(74) *Attorney, Agent, or Firm* — Jenkins, Wilson, Taylor & Hunt, P.A.

(57) ABSTRACT

The invention provides a method for producing a component (37) for aerospace, with the following method steps: supplying a lay-up arrangement (1) to be laid by means of a tape-laying machine (25), with a glass-fiber lay-up (8), which is preimpregnated with a resin matrix (10), and/or supplying a structural arrangement (12) to be laid by means of a tape-laying machine (25), with a structure (16) which is made of metal and is preimpregnated with a resin matrix (18), laying the lay-up and/or structural arrangement (1; 12) on a laminating apparatus (23) by means of a tape-laying machine (25), and curing the lay-up and/or structural arrangement (1; 12) and therefore forming the component (37).

6 Claims, 3 Drawing Sheets

(56) References Cited

U.S. PATENT DOCUMENTS

| | | | |
|---|---|---|---|
| 4,707,212 | A | 11/1987 | Hailey et al. |
| 5,470,413 | A * | 11/1995 | Cedarleaf ............... 156/90 |
| 5,968,445 | A * | 10/1999 | McCarville et al. ......... 264/571 |
| 6,086,975 | A | 7/2000 | Brick et al. |
| 6,517,658 | B1 | 2/2003 | Wageman |
| 6,992,027 | B1 | 1/2006 | Buckingham et al. |
| 7,014,143 | B2 * | 3/2006 | Pham et al. ............... 244/10 |
| 8,206,823 | B2 * | 6/2012 | Schaaf et al. ............... 428/341 |
| 2002/0059976 | A1 | 5/2002 | Taggart |
| 2005/0109451 | A1 * | 5/2005 | Hauber et al. ............... 156/250 |
| 2005/0238892 | A1 | 10/2005 | Evans |
| 2006/0051592 | A1 * | 3/2006 | Rawlings et al. ........... 428/423.1 |
| 2006/0057331 | A1 | 3/2006 | Lucas |
| 2007/0141927 | A1 | 6/2007 | Brown |

FOREIGN PATENT DOCUMENTS

| | | | |
|---|---|---|---|
| DE | 19737966 | 8/1998 | |
| EP | 0431916 | 6/1991 | |
| EP | 0522663 | 1/1993 | |
| EP | 0626251 | 11/1994 | |
| GB | 2421926 | 7/2006 | |
| GB | 2433467 | 6/2007 | |
| JP | 11-138669 | 5/1999 | |
| JP | 2006219078 | * 8/2006 | ............... B64C 1/00 |
| JP | 05-261859 | 8/2013 | |
| RU | 2052353 | 1/1996 | |
| SU | 956286 | 9/1982 | |
| WO | WO 99/12727 | 3/1999 | |
| WO | WO 2006/001860 | 1/2006 | |
| WO | WO 2006/037083 | 4/2006 | |

OTHER PUBLICATIONS

International Search Report for PCT/EP/2007/057032 dated Oct. 30, 2007.

Neitzel et al., "Handbuch Verbundwerkstoffe," 2004, ISBN 3-446-22041-0, pp. 258-270, with English translation of relevant parts of Section 9.2.2.

Decision to Grant for Russian Patent Application No. 2009/102192/05(002766) dated Jun. 24, 2011.

Chinese Office Action for Application No. 200780026548.1 dated Sep. 23, 2011.

* cited by examiner (I-I)

(II-II)

(III-III)

LAY-UP ARRANGEMENT AND STRUCTURAL ARRANGEMENT AND METHOD FOR PRODUCING A COMPONENT FOR AEROSPACE

The present invention relates to a lay-up arrangement to be laid by means of a tape-laying machine, to a structural arrangement to be laid by means of a tape-laying machine, and to a method for producing a component for aerospace.

Although usable in any desired spheres of aerospace, the present invention and the problem on which it is based are explained in more detail with reference to the production of a wing shell of an aircraft.

In civil air travel, a transition is increasingly being made to producing entire wing shells from CFRP material in order to reduce the weight of the aircraft. For this purpose, one or more layers of CFRP prepreg material—to be understood as including a carbon-fibre lay-up preimpregnated with a resin matrix—are built up on one another in a laminating apparatus by means of a tape-laying machine. The tape-laying machine ensures highly accurate positioning of the CFRP prepreg material in the laminating apparatus. Such highly accurate positioning is crucial for the later properties, in particular the strength of the aircraft shell to be produced.

In addition, layers of insulating material and/or lightning conductor material have to be applied to or below said one or more layers of CFRP prepreg material.

Insulating materials of this type are typically designed in the form of glass-fibre wovens. They prevent direct contact between the wing shell made of CFRP and aluminium components, for example ribs or frames, of the wing. Thus, the glass-fibre materials provide electrical insulation between the wing shell made of CFRP and the aluminium component and thus prevent corrosion of the aluminium component.

Lightning conductor materials typically have a bronze mesh—which is to be understood as including wovens made of fine bronze wires. They make it possible for the electrical charge during a lightning strike into the wing shell to be conducted away from the wing shell.

In order to produce the wing shell, the glass-fibre woven and/or the bronze mesh material are provided, in a first step, with a resin matrix and, in a second step, are laid accurately in terms of position in the laminating apparatus. A problem in this connection is that the steps are at present carried out manually. This is very time-consuming and requires a high outlay on personnel, which results in high production costs for the production of wing shells of this type. The required accuracy in the positioning can also be achieved only with difficulty manually and therefore often results in positioning errors.

It is therefore an object of the present invention to make possible a more cost-effective, in particular automated, production of a component with insulating and/or lightning conductor material, for aerospace.

According to the invention, this object is achieved by a lay-up arrangement, by a structural arrangement and/or by a method with the features described herein.

According thereto, a lay-up arrangement to be laid by means of a tape-laying machine is supplied, with a glass-fibre lay-up which is preimpregnated with a resin matrix.

Furthermore, a structural arrangement to be laid by means of a tape-laying machine is supplied, with a structure which is made of metal and is preimpregnated with a resin matrix.

Furthermore, a method is supplied for producing a component for aerospace, with the following method steps: supplying a lay-up arrangement to be laid by means of a tape-laying machine, with a glass-fibre lay-up, which is preimpregnated with a resin matrix, and/or supplying a structural arrangement to be laid by means of a tape-laying machine, with a structure which is made of metal and is preimpregnated with a resin matrix, laying the lay-up and/or structural arrangement on a laminating apparatus by means of a tape-laying machine, and curing the lay-up and/or structural arrangement and therefore forming the component.

The idea on which the present invention is based involves making automated laying of the lay-up arrangement and/or structural arrangement possible. For this purpose, instead of glass-fibre wovens, glass-fibre lay-ups which have already been preimpregnated are used as the insulating material. Glass-fibre lay-ups which are provided with a resin matrix have better maneuverability for automation than glass-fibre wovens. The same applies to structures which are made of metal and are preimpregnated with a resin matrix. Compared to manual handling, high mechanical stresses occur during automated handling, in particular during the feeding and supply processes, for example by means of spindles and deflection rollers. Bronze mesh materials, for example, are comparatively sensitive to mechanical loads and would therefore be damaged during automated handling.

The laying of the lay-up arrangement and/or of the structural arrangement by means of a tape-laying machine is advantageous insofar as tape-laying machines are usually already provided for laying CFRP prepreg material and therefore no new acquisitions have to be made in order to process the lay-up arrangement and/or structural arrangement according to the invention. Recourse can therefore be made to existing resources, which leads to cost savings. The manual handling steps are omitted, as a result of which further cost advantages arise. Furthermore, the required positioning accuracy can easily be achieved by means of the automatic tape-laying machines.

More advantageous refinements and improvements of the invention are found in the subclaims.

According to a preferred development of the invention, the glass-fibre lay-up is designed as a unidirectional lay-up. A laminate—construction comprising a plurality of layers—can therefore advantageously be built up, said laminate having a low weight and a very high strength in a desired direction.

According to a preferred exemplary embodiment, the lay-up arrangement is designed in the form of web material. Web material of this type can easily be processed in automatic processes and is readily suitable for building up a sheetlike laminate.

In a further preferred development of the invention, on one side, the glass-fibre lay-up is provided with a backing material, in particular a backing paper, in particular detachable from said glass-fibre lay-up, for supporting the glass-fibre lay-up. The backing paper has two essential functions: firstly, the backing paper supports the preimpregnated glass-fibre lay-up during supplying and feed processes in the automated processing of the lay-up arrangement. Secondly, the backing paper prevents the resin from adhering to the supplying or feeding means, for example spindles or deflection rollers.

According to a preferred exemplary embodiment of the invention, on a further side, in particular opposite the first side, the glass-fibre lay-up is provided with a protective film, in particular detachable from said glass-fibre lay-up, for protecting the glass-fibre lay-up. The protective film has the purpose of facilitating handling, in particular of preventing the glass-fibre lay-up from sticking to feeding means.

According to a preferred development of the invention, the metal of the structural arrangement contains copper, bronze and/or aluminium. These materials are suitable in particular for conducting electrical currents typical in lightning strikes.

According to a further preferred development of the invention, the structural arrangement is designed in a sheetlike manner, in particular in the form of web material. This leads to simplified maneuverability of the structural arrangement during an automated process and to a simple, economical production of a large laminate, as is usually required in the aerospace.

According to a further preferred development of the invention, the structure is designed in the manner of a net, in particular with diamond-shaped, rectangular and/or honeycomb-shaped recesses, in particular along its thickness. In this case, the thickness refers to a sheetlike structural arrangement, with the thickness being the shortest of the three directions of extent of the structural arrangement. Structures of this type are very light and therefore reduce the weight of the aircraft furthermore, owing to their fixed, defined structure, they are better suited than, for example, bronze mesh materials to automated handling.

According to a preferred development of the invention, on at least one of its sides, the structure is provided with a backing material, in particular a backing paper, in particular detachable from said structure, for supporting the structure. The function of the backing paper corresponds here to the backing paper of the lay-up arrangement.

In a further preferred exemplary embodiment of the invention, on one side, in particular the opposite, further side, the structure is provided with a protective film, in particular detachable from said structure, for protecting the structure. The protective film here has the same function as the protective film of the lay-up arrangement.

In a further preferred development of the invention, the tape-laying machine is moved along a plurality of axes, in particular by means of computer numerical control. This permits the building up of a complex laminate, with it being possible for the positioning and orientation of the lay-up arrangement and/or structural arrangement to be adjusted simply, rapidly and highly accurately.

In a further preferred exemplary embodiment of the invention, the lay-up and/or structural arrangement is laid along different directions with reference to the laminating apparatus. A laminate and ultimately a component can thus be produced which has a highly flexible construction which meets the requirements. For example, the glass fibres may be oriented in such a manner with respect to an aluminium component, which is adjacent to the component during the use thereof, that there is minimal wear of the glass fibres.

In a further preferred exemplary embodiment of the invention, a plurality of lay-up and/or structural arrangements are laid in layers one above another. As a result, a laminate is obtained which can take on a lightning conductor function and can also interact without any problem with aluminium components without corroding them.

In a further preferred development of the invention, at least one layer of CFRP prepreg material is laid on, between and/or below the lay-up and/or structural arrangement, in particular by means of the tape-laying machine and/or a further tape-laying machine. This produces a composite material with very high strength, resulting from the CFRP material, and with a lightning conductor and/or anti-corrosion function. If the laying of the CFRP prepreg material, the lay-up arrangement and/or the structural arrangement takes place by means of the same tape-laying machine, the provision of additional machines for laying the lay-up and/or structural arrangements is unnecessary, and a very cost-effective production process is made possible.

According to a further preferred development of the invention, the lay-up arrangement is laid on a component, in particular made of aluminium, by means of the tape-layer. Components are therefore installed in the laminate in an automated manner, with protection against corrosion being ensured. For this purpose, the tape-laying machine could automatically recognize the presence of a component, in particular made of aluminium, and could automatically switch over from CFRP prepreg material to laying the lay-up arrangement on the component.

According to a further preferred development of the invention, the lay-up and/or structural arrangement and/or the CFRP material is supplied to the tape-laying machine by means of a feeding device as a function of requirements. This produces a highly flexible and rapid method of producing the laminate and ultimately components from such composite materials.

The lay-up and/or structural arrangement is preferably supplied as a coiled web material. Coiled web material of this type can be accommodated in a space-saving manner and can easily be supplied, for example by means of a spindle, during an automated process.

The invention is explained in more detail below using exemplary embodiments and with reference to the attached figures of the drawing.

Of the figures:

In the figures, the same reference numbers refer to identical or functionally identical components unless otherwise stated.

FIG. 1 shows, in a perspective view, a lay-up arrangement 1 according to a first exemplary embodiment of the present invention.

Figure 1:
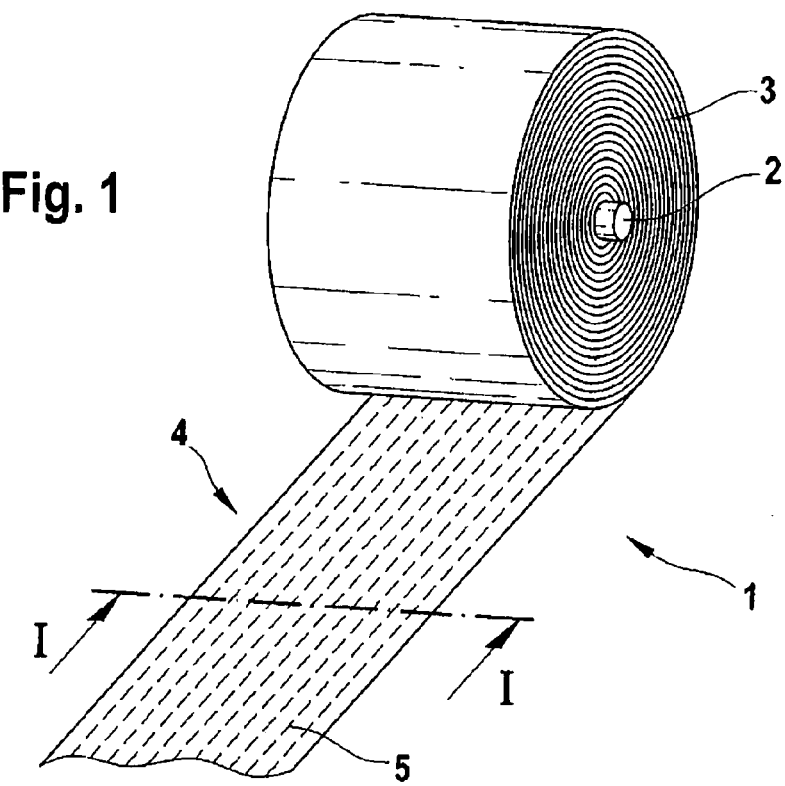
FIG. 1 shows a perspective view of a lay-up arrangement according to a first exemplary embodiment of the invention.

The lay-up arrangement 1 is provided as a bale 3 coiled around a spindle 2. A web-shaped end which has already been uncoiled is provided with the reference number 4. The dashed lines schematically indicate the fibre direction of glass fibres 5 in the lay-up arrangement. The glass fibres 5 preferably run in the uncoiling direction, i.e. along the web-shaped end 4.

Figure 2:
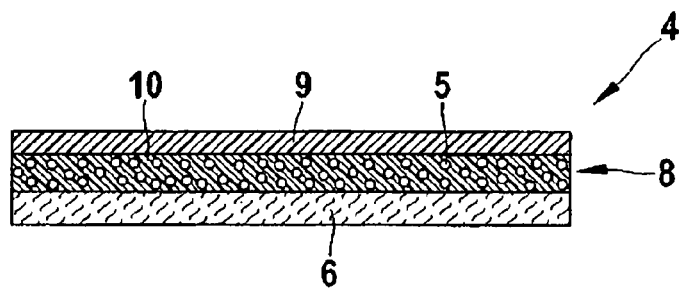
FIG. 2 shows a section along the section line I-I from FIG. 1.

FIG. 2 shows a section along the section line I-I from FIG. 1.

The lay-up arrangement 1 is preferably composed of a backing layer 6, a glass-fibre lay-up 8 and a protective film 9. The backing layer 6 is preferably designed in the form of a paper layer. Above the latter is located a layer of glass fibres 5 which run perpendicularly with respect to the sectional plane. A resin matrix 10 is located between the glass fibres 5. The glass-fibre lay-up 8 is preimpregnated with this resin matrix 10. That is to say, the resin matrix is in a soft state that provides the glass-fibre lay-up 8 with a sufficient amount of support such that the latter is not damaged, for example torn, during supplying processes in automated processing of the lay-up arrangement. The protective film 9 extends above the glass-fibre lay-up 8.

Figure 3:
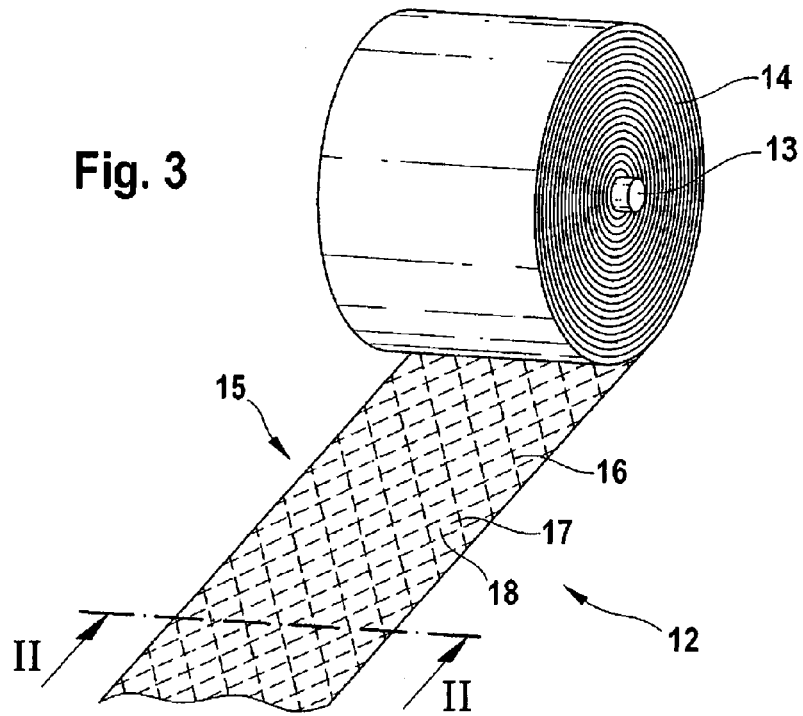
FIG. 3 shows a perspective view of a structural arrangement according to a second exemplary embodiment of the invention.

FIG. 3 shows a structural arrangement 12 according to a second exemplary embodiment of the present invention. The structural arrangement 12 is provided here in the form of a bale 14 coiled around a spindle 13. An uncoiled, web-shaped end of the structural arrangement 12 is provided with the reference number 15. The dashed lines indicate a metal net 16. The metal net 16 has diamond-shaped recesses 17. The diamond-shaped recesses 17 reduce the weight of the structural arrangement 12.

Figure 4:
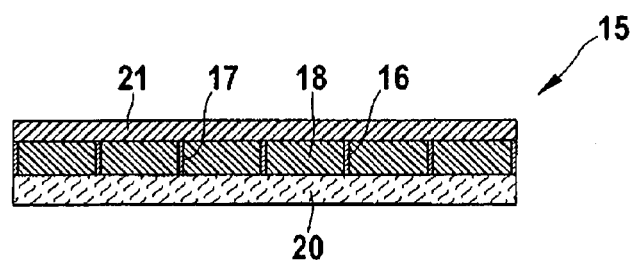
FIG. 4 shows a section along the section line II-II from FIG. 3.

FIG. 4 shows a section along the section line II-II from FIG. 3. The metal net 16, for example made of copper, extends in a sheetlike manner above a backing layer 20, preferably made of a paper material. The metal net 16 is preimpregnated by means of the resin matrix. That is to say, the recesses 17 are filled with a resin matrix 18 and the resin matrix 18 is still in a sufficiently soft state in order to permit automated handling. Above it, a protective film 21 is adjacent to the metal net 16.

Figure 5:
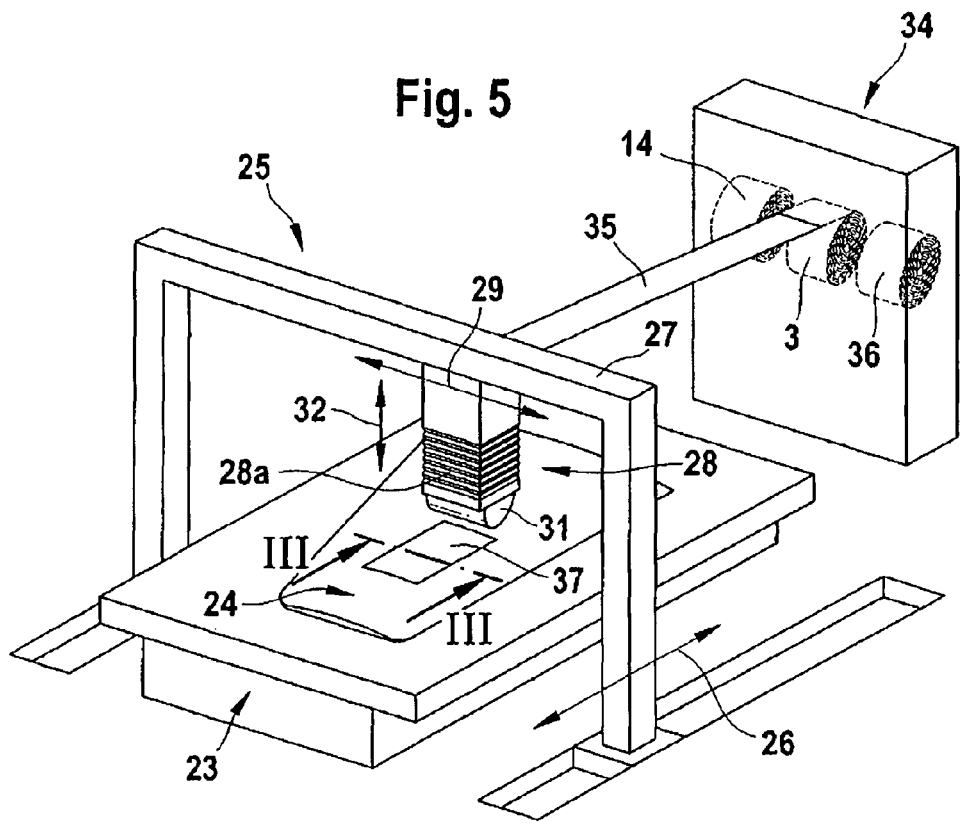
FIG. 5 shows a state of the method during the production of a component for aerospace according to a third exemplary embodiment of the present invention.

FIG. 5 shows a state of the method during the production of a component for aerospace according to a third exemplary embodiment of the present invention.

A laminating apparatus 23 is provided with a contour 24 which, for example, predetermines an outer contour of a wing section 37 to be produced. A tape-laying machine 25 having a framework 27 which is movable along the X-axis 26 has a laying device 28. The laying device 28 is movable along the Y-axis 29 along the framework 27. A laying roller 31 at the lower end of the laying device 28 is both movable along the Z-direction 32 and also designed such that it is pivotable preferably about three degrees of freedom. The laying device 28 preferably has an expansion bellows 28a which protects a mechanism, which is protected by it, and electronics for activating the laying roller 31. The tape-laying machine 25 and therefore the positioning of the laying roller 31 are controlled by means of computer numerical control.

The laying device 28 is fed material for laying and therefore building up a laminate on the contour 24 by means of a feeding device 34. As an alternative to the arrangement shown in FIG. 5, in which the feeding device 34 is designed as a separate device, the feeding device 34 may itself be arranged in the laying device 28 or may be designed as part of the laying device 28.

In the present case, the feeding device 34 feeds the laying device 28 with a lay-up arrangement 1 according to the first exemplary embodiment, which arrangement is indicated by the web 35 and the bale 3. Furthermore, the feeding device 34 preferably has the bale 14 of the structural device 12 according to the second exemplary embodiment. Furthermore, the feeding device has a bale 36 with CFRP prepreg material coiled up on it. The feeding device 34 is designed in order to feed material from the bales 3, 14 or 36 to the laying device 28 as required. This material is then guided through the laying device 28, with the backing layers 6 and 20 being removed in each case. In the tape-laying machine 25, such lay-up arrangements 1 and/or structural arrangements 12 are preferably used without protective films 9, 21.

The structural arrangement 12 and/or the lay-up arrangement 1 and/or the CFRP prepreg material is subsequently applied to the contour 24 by means of the laying roller 31. In the present exemplary embodiment, the exemplary wing section 37, which has been built up by means of the laying device 28, is already located on the contour 24.

Figure 6:
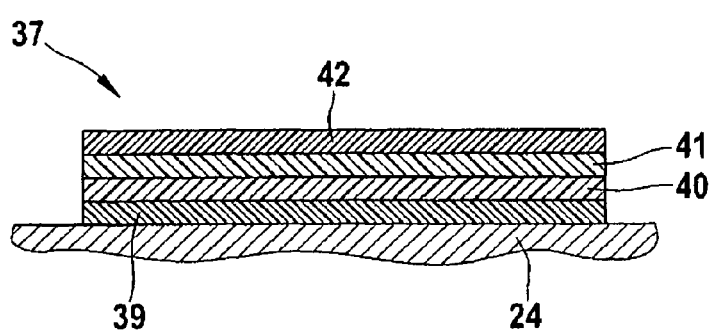
FIG. 6 shows a section along the section line III-III from FIG. 5.

FIG. 6 shows a section through the exemplary wing section 37 from FIG. 5 along the section line III-III.

A first layer 39, which has a preimpregnated metal net, corresponding to the second exemplary embodiment, is applied to the contour 24 by means of the laying device 28. A second and third layer 40, 41 of unidirectional CFRP prepreg material are then applied to the first layer 39. In a further step, a fourth layer 42 composed of preimpregnated glass-fibre lay-up, corresponding to the first exemplary embodiment, is applied to the third layer 41.

There is furthermore the possibility, for example, of subsequently laying a component made of aluminium on the fourth layer 42, of building up a further layer of preimpregnated glass-fibre lay-up on this aluminium component and of completing the entire construction with a plurality of layers of CFRP prepreg material. This could also take place in a fully automated manner.

After the wing section 37 is completed, it is cured, for example, in an autoclave.

Although the present invention has been described in the present case with reference to preferred exemplary embodiments, it is not restricted to them but rather can be modified in diverse ways.

For example, the layers of the wing section according to the third exemplary embodiment may be built up in a different manner. The sequence of different materials, i.e. a preimpregnated layer of metal net, a layer of CFRP and/or a preimpregnated glass-fibre layer may be varied and/or supplemented in extremely varied ways.

For the invention, use may be made of tape-laying machines which are already known or modified tape-laying machines, for example with a special cutting knife for cutting metal nets.

LIST OF REFERENCE NUMBERS

1 Lay-up arrangement
2 Spindle
3 Bale material
4 Uncoiled end
5 Fibres
6 Backing layer
8 Glass-fibre lay-up
9 Protective film
10 Resin matrix
12 Structural arrangement
13 Spindle
14 Bale
15 Uncoiled end
16 Metal net
17 Recesses
18 Resin matrix
20 Backing layer
21 Protective film
23 Laminating apparatus
24 Contour
25 Tape-laying machine
26 X-axis
27 Framework
28 Laying device
28a Expansion bellows
29 Y-axis
31 Laying roller
32 Z-axis
34 Feeding device
35 Web
36 Bale of CFRP prepreg material
37 Wing section
39 First layer
40 Second layer
41 Third layer
42 Fourth layer

The invention claimed is:

1. Method for producing a component for the aerospace industry, comprising:

supplying a structural arrangement comprising a structure which is made of metal and is pre-impregnated with a resin matrix, the structure being formed as a metal net having diamond-shaped, rectangular and/or honeycomb-shaped recesses filled with the resin matrix, and wherein the metal net comprises a fixed and defined structure;

laying the structural arrangement on a laminating apparatus by a tape-laying machine, wherein the structural arrangement is laid along different directions with respect to the laminating apparatus; and curing the structural arrangement to form the component.

2. Method according to claim 1, wherein the tape-laying machine is moved along two or three axes.

3. Method according to claim 1, wherein a plurality of structural arrangements are laid in layers one above another.

4. Method according to claim 1, wherein at least one layer of CFRP prepreg material is laid on, between or below the structural arrangement.

5. Method according to claim 1, wherein the structural arrangement is supplied to the tape-laying machine by a feeding device.

6. Method according to claim 1, wherein the structural arrangement is supplied as a coiled web material.

* * * * *